US012809982B2

(12) United States Patent
Jayaramareddy et al.

(10) Patent No.: US 12,809,982 B2
(45) Date of Patent: Nov. 24, 2026

(54) SECURE OVER THE AIR FLASHING FOR DUAL BANK MEMORIES

(71) Applicant: Atieva, Inc., Newark, CA (US)

(72) Inventors: Tejeswini Jayaramareddy, Fremont, CA (US); Ramesh Sriramaneni, Fremont, CA (US); Amiya Trivedi, Cupertino, CA (US); Vishal Dayanand Devnale, Newark, CA (US)

(73) Assignee: Atieva, Inc., Newark, CA (US)

( * ) Notice: Subject to any disclaimer, the term of this patent is extended or adjusted under 35 U.S.C. 154(b) by 152 days.

(21) Appl. No.: 18/705,330

(22) PCT Filed: Oct. 27, 2022

(86) PCT No.: PCT/US2022/078807
§ 371 (c)(1),
(2) Date: Apr. 26, 2024

(87) PCT Pub. No.: WO2023/077019
PCT Pub. Date: May 4, 2023

(65) Prior Publication Data

US 2025/0005160 A1 Jan. 2, 2025

Related U.S. Application Data

(60) Provisional application No. 63/263,300, filed on Oct. 29, 2021.

(51) Int. Cl.
*G06F 21/57* (2013.01)
*G06F 8/65* (2018.01)
(Continued)

(52) U.S. Cl.
CPC .............. *G06F 21/572* (2013.01); *G06F 8/65* (2013.01); *G06F 12/10* (2013.01); *G06F 21/44* (2013.01); *G06F 2221/033* (2013.01)

(58) Field of Classification Search
None
See application file for complete search history.

(56) References Cited

U.S. PATENT DOCUMENTS 5,568,641 A * 10/1996 Nelson ................ G06F 11/1433 714/E11.135
6,792,499 B1 9/2004 Eldredge
(Continued)

OTHER PUBLICATIONS

NuvoTon; Dual Bank Firmware Upgrade Mechanism; 2018; retrieved from the Internet https://www.nuvoton.com.cn/export/resource-files/AN_0025_M2351; pp. 1-30, as printed. (Year: 2018).*
(Continued)

*Primary Examiner* — Michael W Chao
(74) *Attorney, Agent, or Firm* — Brake Hughes Bellermann LLP

(57) ABSTRACT

Described techniques provide addressing schemes that account for address differences between active and inactive memory banks in dual bank memory architectures used in software over the air (SOTA) updates implemented using address swapping between the dual memory banks, including providing address translations where needed to obtain one standard addressing scheme for purposes of SOTA updates. A timing and implementation of authentication and booting techniques may ensure that signature authentication and boot processes use correct memory addresses across the dual memory banks to enable updates of both an application and a bootloader to occur. Swapping techniques are described that enable robust, secure swapping between the banks, and that enable SOTA updates to hardware security manager (HSM) software, while ensuring use of such HSM software in dual bank scenarios.

15 Claims, 11 Drawing Sheets

(51) Int. Cl.
*G06F 12/10* (2016.01)
*G06F 21/44* (2013.01)

(56) References Cited

U.S. PATENT DOCUMENTS

| | | | | |
|---|---|---|---|---|
| 8,375,221 | B1 * | 2/2013 | Thom | G06F 21/552<br>713/189 |
| 9,766,899 | B2 * | 9/2017 | Huang | G06F 3/0659 |
| 10,409,585 | B2 * | 9/2019 | Troia | H04L 67/34 |
| 12,001,826 | B2 * | 6/2024 | Liedtke | G06F 8/65 |
| 2004/0190362 | A1 | 9/2004 | Hosokawa et al. | |
| 2005/0125407 | A1 * | 6/2005 | Kraus | G06F 21/575 |
| 2006/0075284 | A1 | 4/2006 | Skan | |
| 2009/0113196 | A1 * | 4/2009 | Jan | G06F 8/654<br>713/2 |
| 2010/0058306 | A1 * | 3/2010 | Liles | G06F 21/572<br>717/168 |
| 2011/0320089 | A1 | 12/2011 | Lewis | |
| 2012/0017271 | A1 * | 1/2012 | Smith | G06F 21/575<br>726/19 |
| 2014/0109075 | A1 | 4/2014 | Hoffman et al. | |
| 2014/0310702 | A1 * | 10/2014 | Ricci | G06F 16/25<br>717/173 |
| 2016/0224331 | A1 * | 8/2016 | Jia | H04L 67/06 |
| 2019/0391802 | A1 | 12/2019 | Troia et al. | |
| 2020/0183677 | A1 | 6/2020 | Hong et al. | |
| 2022/0052854 | A1 * | 2/2022 | Kaster | H04L 9/0894 |
| 2022/0156057 | A1 * | 5/2022 | Kobayashi | G06F 8/65 |
| 2023/0169174 | A1 * | 6/2023 | Jung | G06F 11/3656<br>726/26 |

OTHER PUBLICATIONS

SimpleLink; Secure Boot in SimpleLink; 2019; Retrieved from the Internet https://www.ti.com/lit/an/swra651/swra651.pdf; pp. 1-14, as printed. (Year: 2019).*

International Search Report and Written Opinion for PCT Application No. PCT/US2022/078807, mailed on Feb. 23, 2023, 10 pages.

K. Mehta: “Fail-Proof Over the Air Firmware Upgrade for Embedded Systems”, Tallinn University of Technology, Faculty of Information Technology, Department of Computer Engineering; 2016, 50 pages.

Extended European Search Report for European Application No. 22888506.7, mailed Aug. 6, 2025, 9 pages.

* cited by examiner

SECURE OVER THE AIR FLASHING FOR DUAL BANK MEMORIES

CROSS-REFERENCE TO RELATED APPLICATION

This application is a 35 U.S.C. § 371 National Phase Entry Application from PCT Application No. PCT/US2022/078807, filed on Oct. 27, 2022, entitled "SECURE OVER THE AIR FLASHING FOR DUAL BANK MEMORIES", and designating the U.S., which claims priority to U.S. Patent Application No. 63/263,300, filed on Oct. 29, 2021, and entitled "SECURE OVER THE AIR FLASHING FOR DUAL BANK MEMORIES," the disclosures of which are incorporated by reference herein in their entireties.

TECHNICAL FIELD

This description relates to network security for over the air (OTA) flashing.

BACKGROUND

Vehicles, such as automobiles, may have many onboard computing resources. For example, vehicles may include multiple sensors, processors, memories and networking components. Vehicles may use such computing resources for many purposes related to, e.g., the safety and convenience of vehicle passengers. For example, vehicles may use such computing resources to implement software for, e.g., providing semi-autonomous or autonomous driving capabilities.

As software may be improved or upgraded over time, it is convenient to be able to provide over the air (OTA) software updates for vehicle software. For example, a machine learning algorithm for enabling self-driving features may be improved, and it may be desirable to be able to automatically update such an algorithm already installed on a potentially large number of vehicles.

Executing such OTA updates, however, represent a substantial security risk. For example, compromised OTA updates may potentially lead to the loss of confidential information of vehicle users, and, in the case of self-driving features, could lead to loss of control of the vehicle and other critical safety failures.

SUMMARY

A computer program product may be tangibly embodied on a non-transitory computer-readable storage medium and may comprise instructions that, when executed by at least one computing device, may be configured to cause the at least one computing device to initiate an over-the-air (OTA) update of a software application using an application image, using a dual bank architecture with a first memory bank having a first address space and a second memory bank having a second address space, and translate a start address of the application image from the second address space to the first address space, to thereby obtain a translated start address. When executed by the at least one computing device, the instructions may be configured to cause the at least one computing device to calculate a pre-boot application authentication code for the application image, using the translated start address, and write the application image to the second address space, using the start address. When executed by the at least one computing device, the instructions may be configured to cause the at least one computing device to execute a swap of the first address space and the second address space with respect to the first memory bank and the second memory bank, so that the application image has a swapped start address instead of the start address, and perform a reset of the dual bank architecture. When executed by the at least one computing device, the instructions may be configured to cause the at least one computing device to calculate an application authentication code for the application image, using the swapped start address, and verify the application image based on comparing the pre-boot application authentication code and the application authentication code.

Example implementations may include the following. When executed by the at least one computing device, the instructions may be configured to cause the at least one computing device to translate the start address of the application image using an address offset between the first address space and the second address space. The first address space may be a standard address space, and the second address space may be an alternate address space, and the first memory bank may be active and executing an earlier version of the application image during the translating of the start address to the translated start address. When executed by the at least one computing device, the instructions may be configured to cause the at least one computing device to store the pre-boot application authentication code in a hardware security manager (HSM) secure storage. When executed by the at least one computing device, the instructions may be configured to cause the at least one computing device to initiate a second over-the-air (OTA) update of a bootloader using a bootloader image, translate a bootloader start address of the bootloader image from the second address space to the first address space, to thereby obtain a translated bootloader start address, calculate a pre-boot bootloader authentication code for the bootloader image, using the translated bootloader start address, and write the bootloader image to the second address space, using the bootloader start address. When executed by the at least one computing device, the instructions may be configured to cause the at least one computing device to execute a second swap of the first address space and the second address space with respect to the first memory bank and the second memory bank, so that the bootloader has a swapped bootloader start address instead of the bootloader start address, and perform a reset of the dual bank architecture. When executed by the at least one computing device, the instructions may be configured to cause the at least one computing device to calculate a bootloader authentication code for the bootloader image, using the swapped bootloader start address, and verify the bootloader image based on comparing the pre-boot bootloader authentication code and the bootloader authentication code. When executed by the at least one computing device, the instructions may be configured to cause the at least one computing device to verify a bootloader signature of the bootloader image using a signature start address in the second address space, prior to calculating the pre-boot bootloader authentication code. When executed by the at least one computing device, the instructions may be configured to cause the at least one computing device to duplicate a hardware security manager (HSM) module of a HSM from the first memory bank to the second memory bank, calculate the pre-boot application authentication code and the application authentication code using the HSM module and the HSM. When executed by the at least one computing device, the instructions may be configured to cause the at least one computing device to store the pre-boot application authentication code in a secure storage of the HSM. The first memory bank and the second memory bank may be implemented using partitions of a flash memory. The application authentication code may include a cipher-based message authentication code (CMAC).

According to other general aspects, a computer-implemented method may include initiating an over-the-air (OTA) update of a software application using an application image, using a dual bank architecture with a first memory bank having a first address space and a second memory bank having a second address space, and translating a start address of the application image from the second address space to the first address space, to thereby obtain a translated start address. The method may include calculating a pre-boot application authentication code for the application image, using the translated start address, writing the application image to the second address space, using the start address, and executing a swap of the first address space and the second address space with respect to the first memory bank and the second memory bank, so that the application image has a swapped start address instead of the start address. The method may include performing a reset of the dual bank architecture, calculating an application authentication code for the application image, using the swapped start address, and verifying the application image based on comparing the pre-boot application authentication code and the application authentication code.

Example implementations may include the following. The method may include translating the start address of the application image using an address offset between the first address space and the second address space. The first address space may be a standard address space, and the second address space may be an alternate address space, and the first memory bank may be active and executing an earlier version of the application image during the translating of the start address to the translated start address. The method may include storing the pre-boot application authentication code in a hardware security manager (HSM) secure storage. The method may include initiating a second over-the-air (OTA) update of a bootloader using a bootloader image, translating a bootloader start address of the bootloader image from the second address space to the first address space, to thereby obtain a translated bootloader start address, and calculating a pre-boot bootloader authentication code for the bootloader image, using the translated bootloader start address. The method may include writing the bootloader image to the second address space, using the bootloader start address, executing a second swap of the first address space and the second address space with respect to the first memory bank and the second memory bank, so that the bootloader has a swapped bootloader start address instead of the bootloader start address, performing a reset of the dual bank architecture, calculating a bootloader authentication code for the bootloader image, using the swapped bootloader start address, and verifying the bootloader image based on comparing the pre-boot bootloader authentication code and the bootloader authentication code. The method may include verifying a bootloader signature of the bootloader image using a signature start address in the second address space, prior to calculating the pre-boot bootloader authentication code. The method may include duplicating a hardware security manager (HSM) module of a HSM from the first memory bank to the second memory bank, and calculating the pre-boot application authentication code and the application authentication code using the HSM module and the HSM.

According to other general aspects, a vehicle may include a chassis, a frame mounted on the chassis, a motor mounted within the frame, a plurality of sensors mounted on the vehicle and configured to generate sensor data characterizing an environment of the vehicle, at least one memory including instructions, and at least one processor that is operably coupled to the at least one memory and that is arranged and configured to execute instructions that. When executed, the instructions may cause the at least one processor to initiate an over-the-air (OTA) update of a software application using an application image, using a dual bank architecture with a first memory bank having a first address space and a second memory bank having a second address space, translate a start address of the application image from the second address space to the first address space, to thereby obtain a translated start address, and calculate a pre-boot application authentication code for the application image, using the translated start address. When executed, the instructions may cause the at least one processor to write the application image to the second address space, using the start address, execute a swap of the first address space and the second address space with respect to the first memory bank and the second memory bank, so that the application image has a swapped start address instead of the start address, and perform a reset of the dual bank architecture. When executed, the instructions may cause the at least one processor to calculate an application authentication code for the application image, using the swapped start address, and verify the application image based on comparing the pre-boot application authentication code and the application authentication code.

Example implementations may include the following. When executed, the instructions may cause the at least one processor to translate the start address of the application image using an address offset between the first address space and the second address space. The first address space may be a standard address space, and the second address space may be an alternate address space, and the first memory bank may be active and executing an earlier version of the application image during the translating of the start address to the translated start address.

The details of one or more implementations are set forth in the accompanying drawings and the description below. Other features will be apparent from the description and drawings, and from the claims.

DETAILED DESCRIPTION

Figure 1:
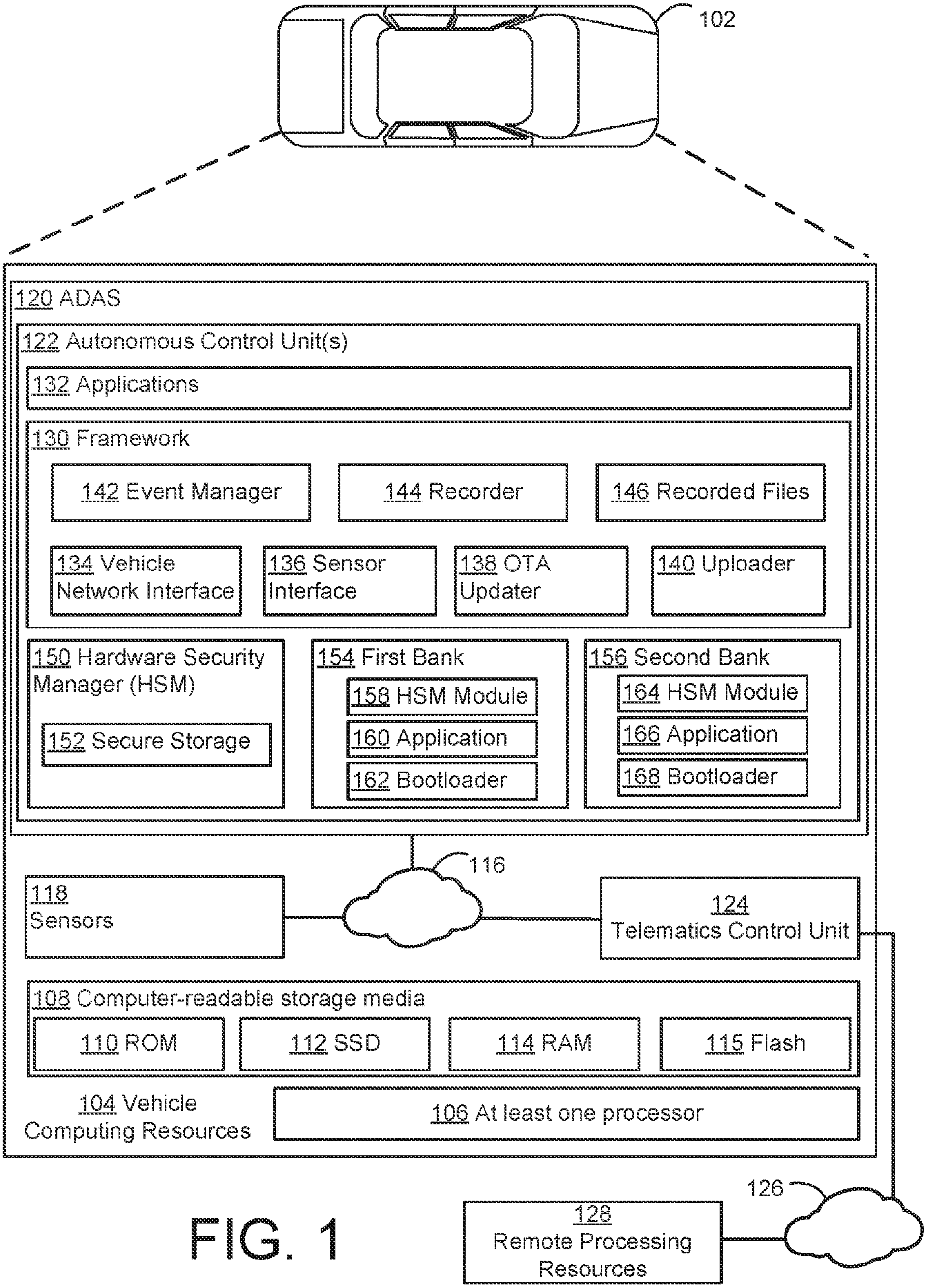
FIG. 1 is a block diagram of a system for secure over the air (SOTA) flashing for dual bank memories.

Processors may implement a dual bank memory architecture to support OTA (also referred to as Software OTA, or SOTA) updates. Use of such a dual bank architecture provides multiple advantages, but may conflict with, or compromise, security requirements associated with OTAs.

For example, a dual bank architecture enables an update to be executed using a second bank, while a first bank is in active use. For example, such an update may include installing a second version of an application (e.g., referred to as Version 2, or v2, or portions thereof) to replace a first version of the application (e.g., referred to as Version 1, or v1, or portions thereof).

Dual bank architectures provide a swapping feature in which the banks are swapped, e.g., from an inactive bank to an active bank. For example, a first bank may be an active bank that is currently executing v1 of the application, while v2 is written to the second, inactive bank. Then, the banks may be swapped, e.g., in conjunction with a restart or other reset event, so that v2 then executes from the second bank.

Dual bank architectures thus enable software updates with very little or no downtime. Dual bank architectures also provide a layer of redundancy, e.g., in case of update failures. For example, in case of an update failure at the second bank, a dual bank architecture enables the use of the first bank as a backup. In other words, dual bank architectures provide an ability to execute a rollback to a previous, working version of the software being updated.

Dual bank architectures, however, may complicate, compromise, or invalidate other security requirements associated with performing SOTA updates. For example, part of a secureboot process may include verifying an authentication code, e.g., a message authentication code (MAC) or cipher-based MAC (CMAC), of one or more software components being updated. However, such authentication codes may depend on the address information of the component being verified. Since an address of a software component (or an updated version thereof) may be changed in conjunction with bank swapping operations, such MAC verification processes will fail.

Additionally, some software components requiring updates may be security-critical, e.g., may provide potential vulnerabilities to attacks. For example, a hardware security manager (HSM), executing one or more HSM modules, may be used to provide trust or security operations related to, e.g., secure keys, certificates, or other security elements. A bootloader associated with booting applications may present vulnerabilities because, e.g., the bootloader may be manipulated to boot an untrusted software image.

Such security-critical components may be particularly problematic to implement and/or update in a dual bank architecture. For example, dual bank architectures may require complete duplication of relevant software components on both of the banks. On the other hand, some security-critical components may specify singular instances of such components.

Described techniques provide addressing schemes that account for address differences between active and inactive memory banks, including providing address translations where needed to obtain one standard addressing scheme for purposes of SOTA updates. Further, the timing and implementation of authentication and booting techniques (e.g., MAC generation and verification) may ensure that signature authentication and boot processes use correct memory addresses across the dual banks to enable updates to both an application and a bootloader (and subsequent successful, secure booting processes) to occur. Still further, swapping techniques are described that enable robust, secure swapping between the banks, and that enable SOTA updates to HSM software, while ensuring the use of such HSM software in dual bank scenarios.

FIG. 1 is a block diagram of a system for secure OTAs for dual bank memory architectures. In the example of FIG. 1, a vehicle 102 is illustrated as a car, but should be understood to represent any type of automobile or automotive vehicle. In other example implementations, the vehicle 102 may represent any mobile, autonomous or semi-autonomous device, including, e.g., a robot, an airplane, a boat, or a drone.

The vehicle 102 may thus include a body of desired type (e.g., a chassis, a frame mounted on the chassis with doors, windows, a roof, trunk, and/or hood), various components for enabling movement of the vehicle, such as wheels/wings, and a suitable motor, such as an electric motor (and associated battery) or internal combustion engine (not separately illustrated in FIG. 1). Various types of vehicle computing resources 104, which may include many different types and configurations of hardware and software resources, may also be included. In the simplified example of FIG. 1, the vehicle computing resources 104 are illustrated as including at least one processor 106, and non-transitory computer-readable storage medium 108.

For example, the at least one processor 106 may represent multiple processors, chipsets, or processing cores. The computer-readable storage medium 108 may represent multiple types of memories, including, e.g., read-only memories (ROM) 110, solid state drives (SSD) 112, random access memories (RAM) 114, or flash memories (Flash) 115 (including, e.g., data FLASH (DFLASH) or program FLASH (PFLASH)).

The vehicle computational resources 104 may also include network hardware used to create a vehicle network 116 within the vehicle 102. For example, the vehicle network 116 may represent, e.g., wiring and related hardware/software to provide one or more busses and related protocols for distributing data within the vehicle 102. As such, the vehicle network 116 provides opportunities for intra-vehicle communication between and among various vehicle subsystems, as described in detail, below.

For example, the vehicle network 116 may utilize existing types of vehicle bus topologies and related busses, including, e.g., the Controller Area Network (CAN) bus, the Local Interconnect Network (LIN) bus, or the Media Oriented Systems Transport (MOST). The network 114 may also represent automotive-grade Ethernet and various types of Transport Control Protocol/Internet Protocol (TCP/IP) networks.

In some implementations, two or more of these technologies may be combined or utilized together. For example, a physical Ethernet connection may be established throughout the vehicle 102 (e.g., as an Ethernet ring that encircles a chassis and/or cabin of the vehicle 102), and may be used to aggregate or distribute multiple CAN busses.

In many implementations, the vehicle 102 may include multiple sensors 118, which may be used to detect information regarding the environment or surroundings of the vehicle 102. For example, the sensors 118 may include video cameras, Light Detection and Ranging (lidar) sensors, ultrasonic sensors, radar sensors, GPS sensors, and various other types of sensors. The sensors 118 may be distributed within and around a chassis, body, and/or cabin of the vehicle 102, where needed to perform intended functions.

In the simplified example of FIG. 1, the vehicle computational resources 104, including the at least one processor 106, the non-transitory computer-readable storage medium 108, the vehicle network 116, and the sensors 118, are illustrated together for ease of illustration and description. Within the vehicle 102, however, as already noted with respect to the vehicle network 116 and the sensors 118, multiple pairs or groups of processors and memories may be distributed in desired locations within the vehicle 102, together with other related hardware, to provide intended functionalities.

For example, multiple control boards may be assembled using desired ones of the at least one processor 106 and the computer-readable storage media 108, and positioned appropriately within the vehicle 102 to perform desired functions. Such control boards and related hardware and software may be referred to generally as electronic control units (ECUs). For example, one or more ECUs may be used to support and enable corresponding vehicle subsystems. Examples of current vehicle subsystems may include subsystems for navigation, including an advanced driver assistance system (ADAS) 120 for autonomous or semi-autonomous systems, which may include one or more Autonomous Control Units (ACUs) 122. Various other vehicle subsystems may relate to, or include, subsystems for vehicle safety features, climate control, and information/entertainment (infotainment) systems.

Another example of an ECU is illustrated in FIG. 1 as telematics control unit (TCU) 124. The TCU 124 may represent a single site of network connectivity for connecting the vehicle 102 to external network(s) 126. Maintaining the TCU 124 as a single site of network connectivity may provide efficiency by reducing or eliminating a need to reproduce connectivity components (e.g., hardware modems) at multiple locations, or for multiple vehicle subsystems, within the vehicle 102.

Moreover, maintaining a single site of network connectivity may assist in protecting the vehicle 102 from various types of cyberattacks. For example, the TCU 124 may be equipped with firewalls and various other protection mechanisms used to prevent attackers from, e.g., controlling operations or the vehicle 102, or accessing confidential information within the vehicle 102.

The TCU 124 may include multiple modems and/or related hardware (including appropriate ones of the at least one processor 106 and the computer-readable storage media 108) for connecting to two or more external networks 126. For example, the TCU 124 may provide external connectivity to WiFi networks, Long Term Evolution (LTE) networks, or 3G/4G/5G networks.

Accordingly, it is possible to use the external networks 126 to exchange vehicle information with remote processing resources 128. For example, as described in detail, below, it is possible to perform over-the-air (OTA) updates of software stored using the computer-readable storage media 108, or to upload navigation data from the vehicle 102 to the remote processing resources 128 for analysis or long-term storage.

As further illustrated, the ACU 122 may include a framework 130. The framework may include an operating system (OS) that, e.g., supports operations of one or more applications 132 of the ACU 122, and that enables connectivity with the vehicle network 116. For example, the framework 130 may provide or include an implementation of the AUTomotive Open Source Architecture (AUTOSAR), which is designed to support the deployment of the applications 132 using an operating system based on the Portable OS Interface (POSIX) standard, which is written using C++ and enables service-oriented communication and application programming interfaces (APIs) for communicating with, e.g., the vehicle network 116 and the applications 132. Additionally, or alternatively, the framework 130 may include other OS implementations, such as automotive grade Linux.

In the example of FIG. 1, the framework 130 is illustrated as including a vehicle network interface 134 for communicating with the vehicle network 116. The framework 130 also includes a sensor interface 136, which represents one or more interfaces for obtaining sensor data from the appropriate ones of the sensors 118.

An OTA updater 138 represents a component for receiving updates of the vehicle 102 via the external network 126. For example, new or updated software may be downloaded via the TCU 124 and installed by the OTA updater 138 within an appropriate or designated memory of the computer-readable storage media 108.

An uploader 140 may be configured to execute any desired transmission of data from the vehicle 102 to the external network 126, using the vehicle network 116 and the TCU 124. For example, the uploader 140 may be configured to upload processed sensor data, or any vehicle data, to the remote processing resources 128.

An event manager 142 represents a component for detecting, determining, processing, and/or characterizing network data received via the vehicle network interface 134 and/or sensor data received via the sensor interface 136, and for then using the network data and/or sensor data, e.g., to control other functions of the framework 130 and the applications 132. Put another way, the event manager 140 represents a control node for controlling and coordinating operations of the framework 130 and the applications 132, to thereby achieve coordinated functions such as, e.g., sensor fusion, multi-layer perception processing algorithms, and autonomous driving control algorithms for controlling steering, braking, or other functions of the vehicle 102.

In specific examples, the event manager 142 may be configured to control operations of a recorder 144 in recording various types of vehicle data, including sensor data, for storage as recorded files 146. For example, the recorded files 146 may be used to store sensor data related to particular events, including driving-related events such as sudden accelerations/decelerations, or impact events including collisions of the vehicle 102. Then, some or all of the recorded files 146 may be uploaded to the external networks 126, and to the remote processing resources 128, using the uploader 140.

In the simplified example of FIG. 1, the various components or modules 134, 136, 138, 140, 142, 144, 146 of the framework 130 are illustrated as singular, individual modules implemented entirely in the context of the framework 130. In various implementations, however, it will be appreciated that specific features and functions of one or more of the framework modules 134, 136, 138, 140, 142, 144, 146 may be implemented in the context of the applications 132, i.e., as application-layer functions. For example, policies of the event manager 142 in defining and controlling sensor events processed by one or more application(s) 132 and recorded by the recorder 144 for uploading by the uploader 140 may be partially or completely governed or implemented at the application layer of the applications 132.

Further in FIG. 1, the ACU 122 is illustrated as including a hardware security manager (HSM) 150. The HSM 150 may represent and include, e.g., hardware components of an underlying processor, represented by the at least one processor 106 and installed on the ACU 122, as well as associated firmware. For example, the ACU 122 (or other ECU) may be implemented using an Infineon TC3xx multi-core processor (although other processors utilizing dual bank architectures as described herein may be used, as well). The HSM 150 may represent a separate processor and associated hardware (e.g., ROM or other memory) and software (e.g., HSM firmware) provided with the ACU 122 to provide specific types of security-related features and functions, as described herein.

The HSM 150 may include secure storage 152. For example, as referenced above, the secure storage may be used to store various keys, certificates, and other trust elements, as well as related algorithms for processing such trust elements. Although not pictured in FIG. 1, the HSM 150 may include various related components, such as designated ROM storage resources (e.g., to implement some or all of the secure storage 152) and necessary interfaces for exchanging information with other components of FIG. 1.

FIG. 1 also includes a first bank 154 and a second bank 156, which may also be referred to as Bank A and Bank B, respectively. The first bank 154 and the second bank 156 (which may also be referred to, or represent, partitions) may represent examples of the flash memory 115 installed on the ACU 122. The first bank 154 may have a first physical address space, which may be mapped to a first logical address space, and the second bank 156 may have a second physical address space, which may be mapped to a second logical address space. For example, when the first bank 154 is actively executing any application, the first bank 154 may be referred to as having a standard address space, and the second bank 156 may be referred to as having an alternate address space.

As described in detail, below, e.g., with respect to FIGS. 3-7, the first bank 154 and the second bank 156 may be provided with a unified address range to enable and facilitate easy address translation between the two banks. For example, there may be a defined address offset between the two banks, so that a standard address space is offset from an alternate address space by a specified quantity of address spaces or locations.

As further illustrated in FIG. 1, the first bank 154 may include an HSM module 158, an application 160, and a bootloader 162. Similarly, the second bank 156 may include a duplicate HSM module 164, a duplicate application 166, and a duplicate bootloader 168. That is, as referenced above, the illustrated dual bank architecture of FIG. 1 may require duplication between the banks 154, 156, particularly with respect to the security-critical components such as the HSM modules 158, 164 and the bootloaders 162, 168, notwithstanding the fact that differences may exist between pairs of duplicated components at times during an update process, e.g., as updated images are downloaded and before bank swapping has been completed.

For example, the HSM modules 158, 164 may represent or include interfaces between the bootloaders 162, 168 and the HSM 150. The HSM modules 158, 164 may also represent or include a form of secure storage for enacting functionalities of the HSM 150.

The OTA updater 138 may be configured, as referenced above, to execute OTA updates of any permitted and enabled software of the ACU 122. For example, the OTA updater 138 may implement the Unified Diagnostics Services (UDS) protocol for OTA updates.

For example, during such updates, a particular software image may be downloaded using the TCU 124. The software image may be required to be updated on one or more ACUs of the ADAS 120, including the ACU 122. Accordingly, the software image may be transmitted to each ACU using the vehicle network 116.

Secure flashing of the downloaded software image thus refers to securely flashing the downloaded software image into implementations of flash memory 115 installed on the ACU 122, e.g., using the first bank 154 and the second bank 156. Secure booting refers to booting processes, which may occur during any booting operation, and in the context of SOTA updates, may occur after the software image is flashed. That is, secure booting may occur during a power cycle or reset event subsequent to the secure flashing, to confirm the integrity of the flashed software, and to ensure that the booting process has not been corrupted to cause booting of, e.g., a different and/or untrusted software image.

In the example of FIG. 1, secure flashing and subsequent secure booting are enabled with respect to any updateable application, as well as the HSM module 158 (and duplicate HSM module 164) and the bootloader 162 (and duplicate bootloader 168). Further, the duplication of components (158/164, 160/166, and 162/168) required by the dual bank architecture of FIG. 1 may be maintained, even when individual security-critical components may have been designed to be implemented and maintained as singular instances.

In more detail, in conventional SOTA update systems, only a single flash memory bank may be used, e.g., the first bank 154. In such a single bank solution, a bootloader and HSM module (e.g., the bootloader 162 and the HSM module 158) may interface with one another and with the HSM 150 to provide secure updating of an application, such as the application 160.

For example, in a single bank solution, the OTA updater 138 may obtain a new image (e.g., referred to as version 2, or v2), represented by the application 166, to replace a current image of the application 160 (e.g., referred to as version 1, or v1). As noted above, secure flashing of v2 refers generally to secure flashing of bits of v2 into the first bank 154, which may include both authenticating a provider of the image (e.g., in a challenge/response scenario) and/or authenticating a signature associated with the new image, e.g., using an appropriate signature authentication algorithm (e.g., a public/private key pair or other asymmetric algorithm). In some cases, one or more authentication codes (e.g., MAC, or CMAC) may also be calculated, for use in subsequent secure booting operations, as described below. In conjunction with successful authentication, flashing of the new image for v2 into the first bank 154 may occur, including erasing v1 and writing v2.

Then, the bootloader 162 and the HSM module 158 may be configured to work together and with the HSM 150 to provide secure booting of v2. Secure booting ensures, for example, the integrity of the HSM module 158, v2 of the application 160, and/or the bootloader 162, e.g., by calculating a message integrity code (MIC), which may also be referred to as a message authentication code (MAC), or just authentication code, as referenced above.

For example, a MAC may be calculated based in part on the characteristics of an image, such as its size and address space (e.g., start address), and compared to a previously-calculated MAC value. For example, a BOOT_MAC calculated for the bootloader 162 may be calculated at a point in time, e.g., during production, and stored in the secure storage 152 of the HSM 150. During typical secure booting, the HSM 150 may re-calculate the BOOT_MAC and compare the two values to verify the authenticity and integrity of the bootloader 162.

In additional examples, as described in detail, below, a pre-boot BOOT_MAC may be calculated after (or in conjunction with) the secure flashing, and a new BOOT_MAC calculated during the boot event may be compared to the pre-boot BOOT_MAC. By verifying the pre-boot BOOT_MAC, the secure booting process ensures that no illicit activities were included. Similarly, a pre-boot application MAC (referred to herein as APP_MAC) may be calculated and then compared to a new APP_MAC in conjunction with the booting process, e.g., to ensure that the booting process did not change the application in an undesired manner.

The HSM 150 may provide a number of advantages in such procedures. For example, as a hardware-based solution, the HSM 150 may provide very fast calculations of the BOOT_MAC and other verification data. For example, in addition to MAC generation, the HSM 150 may provide fast calculations of known algorithms such as the RSA public key algorithm, SHA256, AES128 key algorithms, and others. Moreover, the HSM 150 and related firmware (FW) may provide secure storage of any related secrets obtained in conjunction with such calculations, including secure (e.g., encrypted) exchange with interfaces of the HSM module 158.

As a result of such security measures, however, conventional implementations of the HSM 150 are not compatible with the dual bank architecture of FIG. 1. For example, as referenced above, when SOTA updates are performed in FIG. 1, v2 of v1 of the application 160 may be flashed to the second bank 156 as the image illustrated as application 166. In other words, v2 is securely flashed (written) to the second bank 156 as an inactive bank while v1 executes in the first bank 154 as the active bank.

For example, the types of source authentication for v2 referenced above may be performed, and v2 may be written, without disrupting the ongoing operations of v1 as the application 160 in the first bank 154. Moreover, a pre-boot APP_MAC may be calculated. Specifically, in conventional dual bank systems, such calculations may be performed using the address space of the inactive second bank 156, e.g., the physical or logical address space of the second bank 156.

In the context of a subsequent secure boot event, in conventional systems, a swap may be executed, e.g., by the OTA updater 138 and/or the bootloader 168, so that the second bank 156 becomes the active bank, while the first bank 154 becomes an inactive bank. For example, the second bank 156 may be assigned the first logical address space previously assigned to the first bank 154, so that the second bank 156 becomes the active bank. Meanwhile, the bank 154 is assigned the second logical address space previously assigned to the second bank 156, so that the first bank 154 becomes the inactive bank.

During a subsequent secure boot event, in conventional dual bank systems, the bootloader 168 and the HSM 164 may attempt to perform verification of the pre-boot APP_MAC and the pre-boot BOOT_MAC, using the v2 address space, which is now the active address space previously assigned to the first bank 154. Consequently, the calculated APP_MAC and BOOT_MAC generated using the active address space will not match the pre-boot APP_MAC and pre-boot BOOT_MAC generated using the inactive address space, and the secure booting process will fail.

In contrast, the system of FIG. 1 may be configured to perform secure flashing with address translation. For example, as described in detail, below, when write operations are performed with respect to the second bank 156, e.g., when flashing v2 as the application 166, translated addresses may be stored in conjunction therewith that will correspond to the addresses to be used to calculate the APP_MAC during a subsequent secure boot event. Consequently, the pre-boot APP_MAC and the APP_MAC may be generated using the same address spaces, and MAC verification for the application being updated will be successful. Moreover, as also described in detail, below, described techniques enable updating of the bootloader itself, so that a pre-boot BOOT_MAC and subsequent BOOT_MAC may also be successfully verified.

Figure 2:
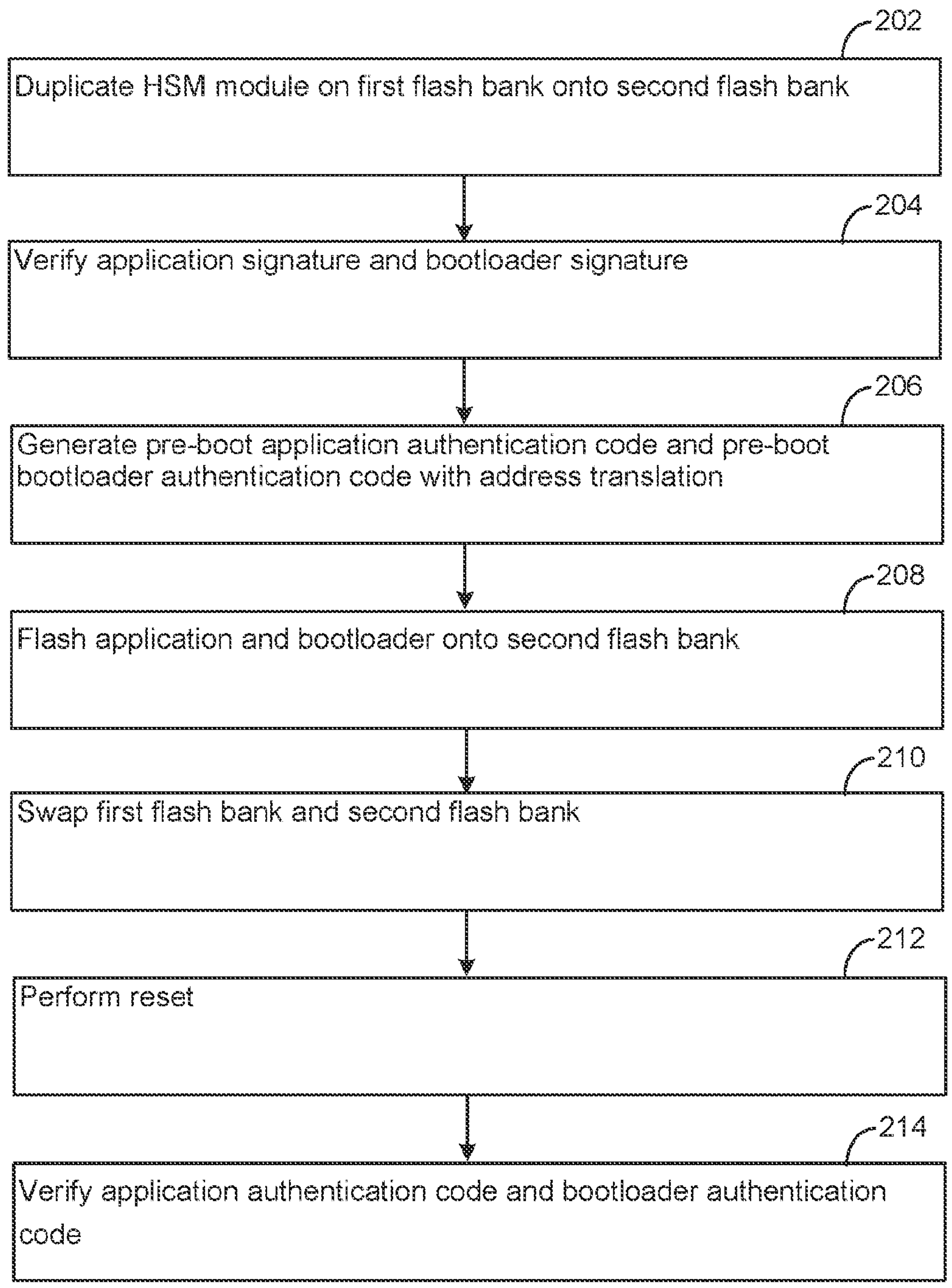
FIG. 2 is a flowchart illustrating example operations of the system of FIG. 1.

FIG. 2 is a flowchart illustrating example operations of the system of FIG. 1. In the example of FIG. 2, operations 202-214 are illustrated as separate, sequential operations. In various implementations, the operations 202-214 may include sub-operations, may be performed in a different order, may include alternative or additional operations, or may omit one or more operations. Further, in all such implementations, included operations may be performed in an iterative, looped, nested, or branched fashion.

As noted above, a requirement of the dual bank architecture of FIG. 1 may be that the first bank 154 and the second bank 156 are duplicates of one another, except transiently during an OTA as updates are flashed to, e.g., the second bank. In contrast with the application 160 and the bootloader 162 (which use the swap techniques as described herein), the HSM module 158 may be configured or required to be updated directly in the first bank 154 as the active bank. Moreover, such update processes for the HSM module 158, or for the HSM 150 in general, may be complex due to the security requirements of the HSM 150.

In the example of FIG. 2, existing HSM update processes may be leveraged to enable described operations of the system of FIG. 1. For example, the update process of the HSM module 158 may be executed and supplemented with a requirement to duplicate the HSM module 158 on the inactive second bank 156 as the HSM module 164 (202). For example, HSM duplication in the inactive bank 156 may be performed in the context of upgrading the HSM module 158, by including an interface to call for a system upgrade, where the interface writes to both physical banks 154, 156 to perform HSM duplication.

A secure flashing operation(s) may then be executed. In the example of FIG. 2, both the application 160 and the bootloader 162 may be updated to the application 166 and the bootloader 168. In example implementations, it is possible to update just the application 160 or just the bootloader 162. FIG. 2 provides a high-level overview of example and relevant secure flashing operations (and subsequent secure booting operations), and is not intended to provide an exhaustive description. More detailed examples are provided below, e.g., with respect to FIGS. 8-11.

In FIG. 2, the secure flashing includes verifying an application signature of the application 166 and a bootloader signature of the bootloader 168 (204). For example, the signature verification(s) may be performed using the inactive address space of the second bank 156, to which subsequent writing is expected.

A pre-boot APP_MAC and pre-boot BOOT_MAC or other authentication code(s) may then be generated, with address translation between the active first bank 154 and the inactive second bank 156 (206). As referenced above, and described in detail, below, with respect to FIGS. 2-7, such address translation may be used to ensure that a subsequent verification of the relevant authentication codes will be successful following a bank swapping operation.

Then, the application 166 and the bootloader 168 may be flashed onto the second flash bank 156 (208), while the second bank 156 is inactive and the first bank 154 is active. Such flashing may be performed across multiple ACUs 122, while typical operations of all such ACUs 122 are ongoing. Then, prior to a single subsequent reset, a swapping of the first bank 154 and the second bank 156 (for all ACUs 122) may be executed (210). Consequently, the start address of the application 166 (or the bootloader 168) may be referred to as a swapped start address.

After the reset is performed (212), a secure boot process may be implemented, in which the application authentication code APP_MAC and the bootloader authentication code BOOT_MAC may be recalculated and verified (214). Since the earlier swap operation results in the second bank 156 having the active or standard addressing, the APP_MAC and BOOT_MAC will automatically be generated in accordance therewith. As a result, the APP_MAC will successfully be verified against the pre-boot APP_MAC, and the BOOT_MAC will successfully be verified against the pre-boot BOOT_MAC. In other words, each authentication code may be calculated with a pre-boot translated start address and then subsequently with a swapped start address that is equivalent to the translated start address, so that the authentication code(s) will match.

Figure 3:
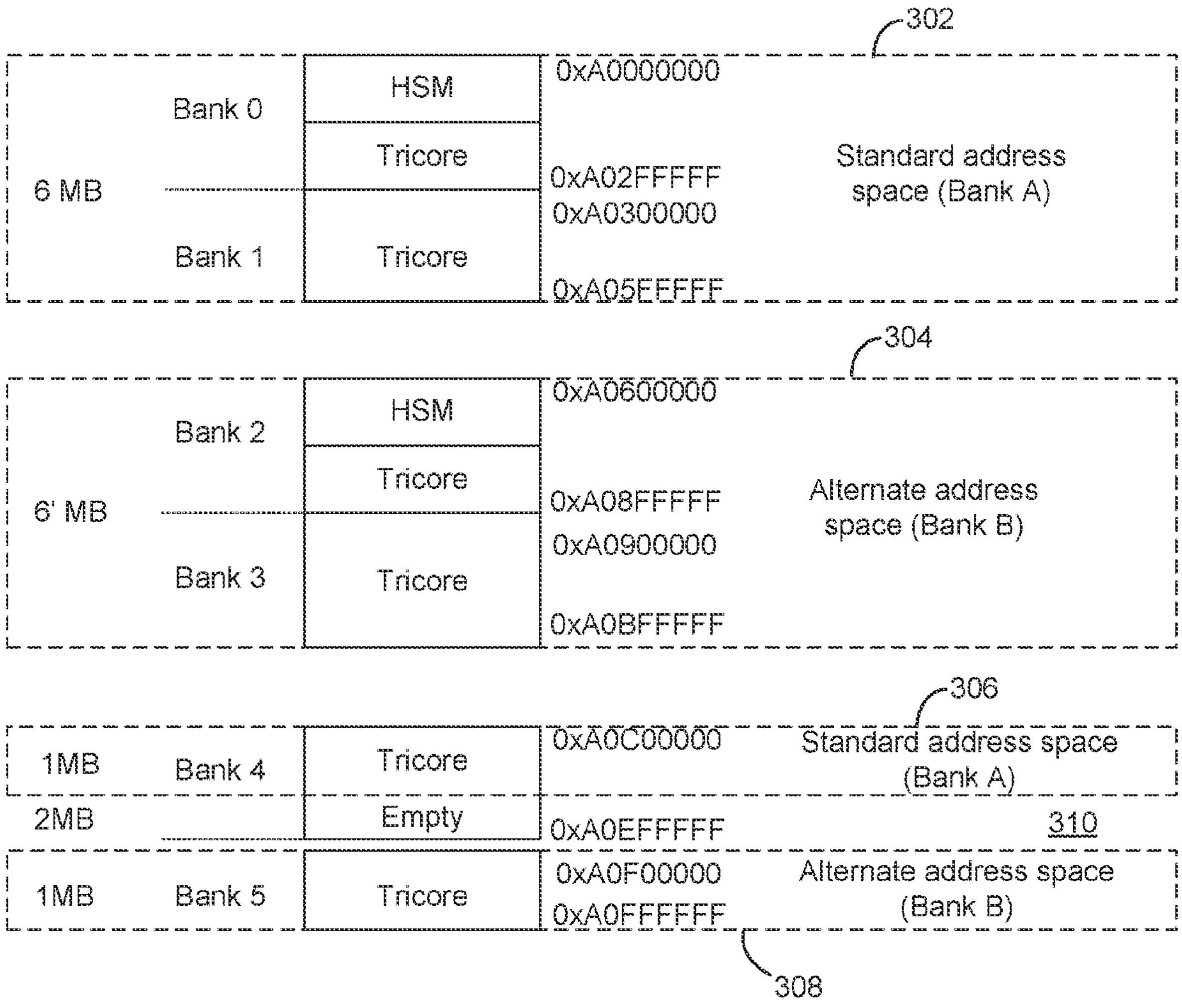
FIG. 3 is a block diagram illustrating an example dual bank address scheme that may be used in the system of FIG. 1.

FIG. 3 is a block diagram of an example program flash memory architecture and associated swap mechanism, such as may be implemented using the Infineon TC39xx processor/platform referenced above. FIG. 3 provides specific example address scheme(s) for use in subsequent discussions of FIGS. 4-11, but such address schemes are not limiting, and other addressing techniques may be used. As also referenced above, described techniques enable secure flashing and reliable, secure booting.

The SWAP mechanism for SOTA of the Infineon TC39xx platform operates as referenced above, and splits the Flash memory of MCU (Micro Controller Unit) into two banks, A and B. Bank A is here called Standard addressing and Bank B is here called Inactive addressing. If SOTA is enabled, one of the banks will be active and the other bank is inactive. Using the available SWAP mechanism, it is possible to switch the active bank to the other and vice versa.

The various features, functions, and advantages referenced above may be obtained in the context of the example of FIG. 3, as described in more detail, below, with respect to FIGS. 4-11. For example, address translation may be provided to enable flashing of the Inactive bank from the Active bank while the images are built with one standard addressing.

As another example, to enable update of a bootloader component, BOOT_MAC computation of the inactive bank may be executed after a signature authentication is successful. Signature authentication may be performed with the inactive bank address and secure booting with the active bank address, as noted above.

Further, the SOTA and secure boot in HSM may be enabled only after a first time successful OTA. For example, on reset (e.g., restart) after the OTA, the software will boot in the other bank, so that only on successful OTA is it possible to ensure the secure boot process can be successful.

Additionally, the swap function may be enabled only after signature authentication and BOOT_MAC generation of bootloader in the inactive bank to avoid hardware bricking in response to perceived threat or other malfunctions. For example, a reset may be performed after the SWAP enabling, as shown in FIG. 2, to make sure the secure boot will not fail on the other bank.

As shown in FIG. 3, TC39xx includes 16 MB Program flash divided into banks 302, 304, 306, 308. To facilitate software over the air updates with dual bank support, PFLASH is divided into two banks, Bank A (302, 306) and Bank B (304, 308). Bank A is also referenced by a standard address space ranging from 0xA0000000 to 0xA05FFFF (6 MB) and 0xA0C00000 to 0xA0CFFFFF (1 MB). 2 MB of program flash from 0xA0D00000 to 0xA0EFFFFF in Bank 4 (310) is empty. Therefore, 7 MB of program flash is grouped to Bank A. Similarly, Bank B is referenced by Alternate address space range from 0xA0600000 to 0xA0BFFFFF (6 MB) and 0xA0F00000 to 0xA11EFFFFF (1 MB). Therefore, 7 MB of program flash is grouped to Bank B. 640 KB of PFLASH in Bank 0 and 640 KB in Bank 2 are dedicated to HSM.

Figure 4:
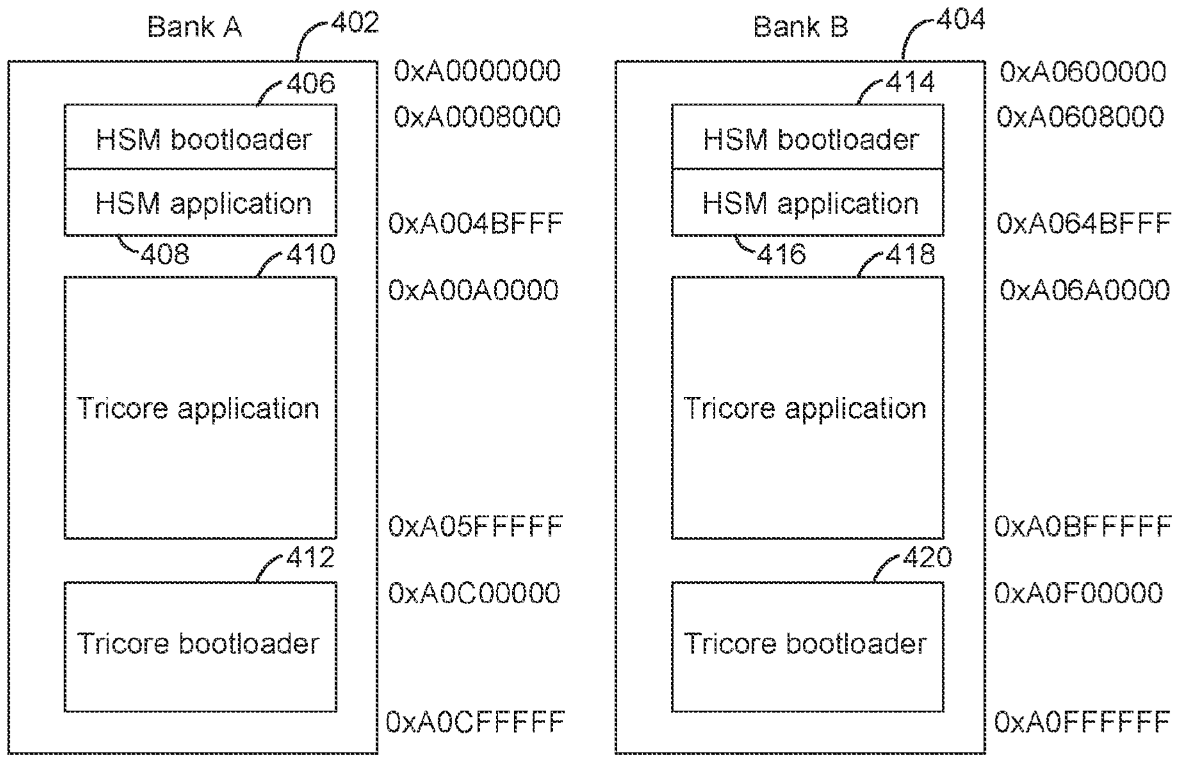
FIG. 4 is a block diagram illustrating an example dual bank memory that may be used in the system of FIG. 1, using the dual bank address scheme of FIG. 3.

FIG. 4 is a block diagram illustrating an example program flash layout with dual banks, shown as Bank A 402 and Bank B 404. As noted above, dual bank and associated swap mechanisms require duplication of all images in PFLASH Bank A 402 and Bank B 404. FIG. 4 shows an example layout of Bank A 402 and Bank B 404 illustrating the allocation of software components with address ranges.

As shown HSM software module(s) comprises two blocks, HSM Bootloader 406 and HSM application 408, and HSM Bootloader 414 and HSM application 416. TC3xx supports a secure boot of the HSM application image(s) 408, 416, in which HSM application 408, 416 verification is provided by HSM bootloader 406, 414.

Then, the HSM application 408, 416 verifies Tricore bootloader 412, 420, respectively, and supports secure boot of the Tricore bootloader 412, 420. The Tricore bootloader may be referred to herein as the root of trust.

The Tricore bootloader 412, 420 may then request the HSM application 408, 416 to verify the Tricore application 410, 418. The Tricore application 410, 418 may be referred to herein as a secure boot extension.

Figure 5:
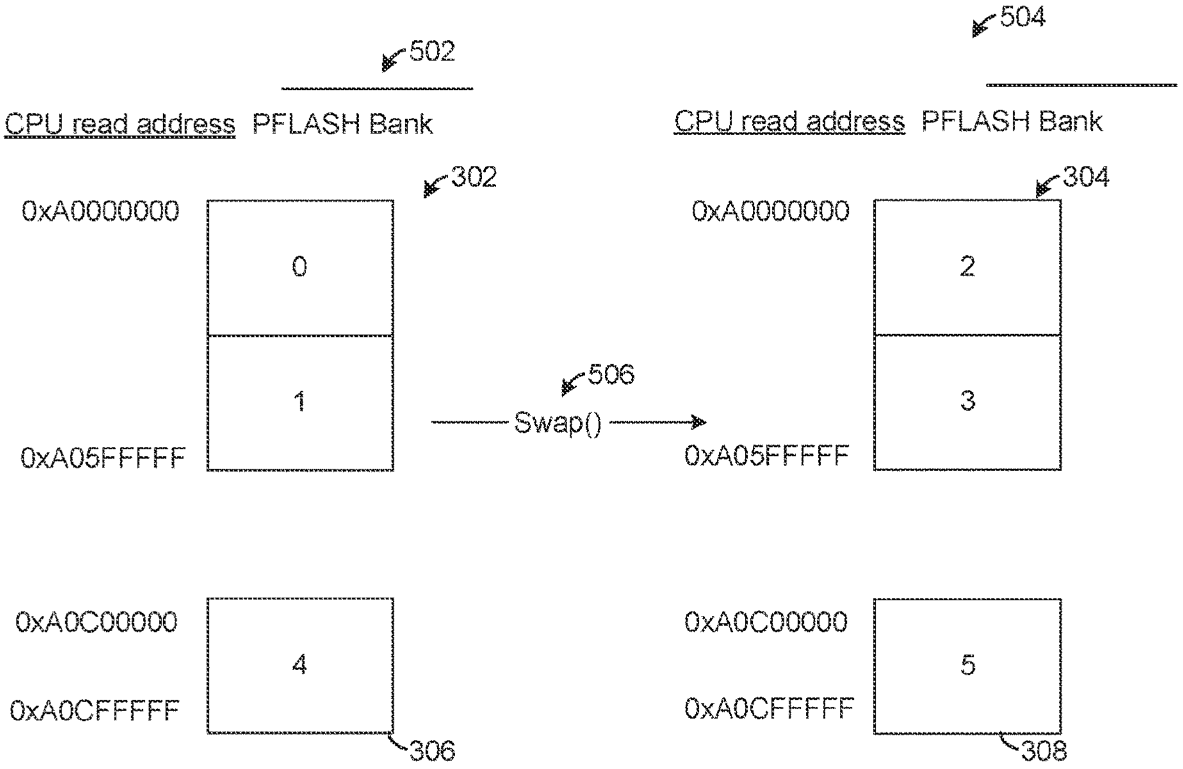
FIG. 5 is a block diagram illustrating example read operations that may be performed using the address scheme and dual bank memory of FIGS. 3 and 4.

FIG. 5 illustrates an example CPU read address(es) before and after a bank swap. That is, FIG. 5 describes the behavior of CPU read operations. In FIG. 5, applications from bank A 502 and bank B 504 are executed by mapping to the standard address space. That is, PFLASH Bank 0, 1 and 4, corresponding to banks 302 and 306 of FIG. 3 have their address ranges mapped to Bank B 504, so that PFLASH Bank 2,3 and 5, corresponding to banks 304 and 308 of FIG. 3, are read with the address ranges previously used for bank A 502.

Put another way, the left view illustrates PFLASH bank A 502 mapped to the standard address range for CPU read and execute. After the bank swap 506, bank B 504 is mapped to standard address space as illustrated on the right view.

Figure 6:
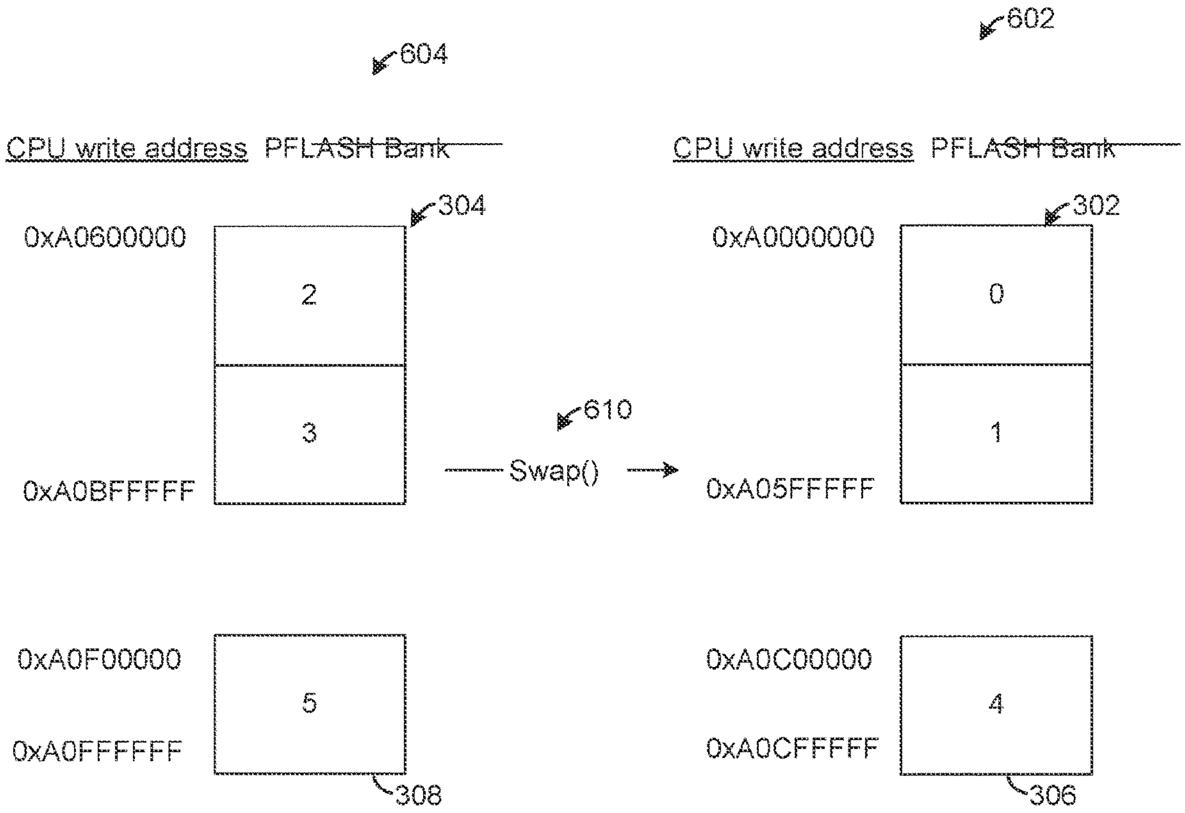
FIG. 6 is a block diagram illustrating example write operations that may be performed using the address scheme and dual bank memory of FIGS. 3 and 4.

FIG. 6 illustrates a CPU write address before and after a bank swap. That is, FIG. 6 illustrates a CPU write perspective. As shown, CPU write operations go into the specified targeted physical program flash address map.

In FIG. 6, the left view shows mapping of bank B 604 with its physical address range for CPU writes. After a Bank swap, CPU writes are directed to bank A 602 mapped with its physical address.

Thus, FIG. 6 illustrates that application images may be generated with standard address space symbols. As illustrated in FIG. 6, when Bank A is active, address translation is required for CPU writes to Bank B.

Figure 7:
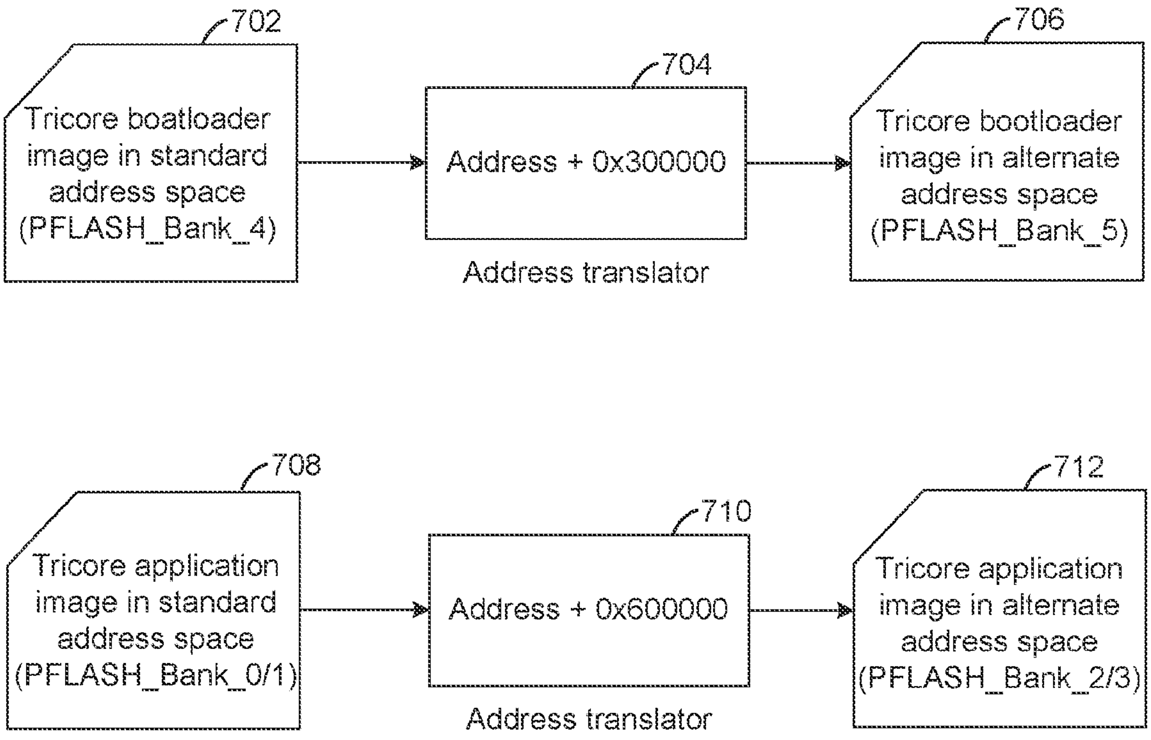
FIG. 7 is a block diagram illustrating address translation for the system of FIG. 1, using the address scheme and dual bank memory of FIGS. 3 and 4.

FIG. 7 illustrates a more specific example of such address translation from the standard address range to the alternate address range, for a bootloader image and an application image. In FIG. 7, a bootloader image 702 in a standard address space (corresponding to bank 4, above) may be operated on by an address translator 704 that translates the standard address in the standard address space by an address offset (shown as an addition of 0x300000 in FIG. 7) to obtain a bootloader image 706 with a translated address in the alternate address space (corresponding to bank 5, above).

Similarly for an application, FIG. 7 illustrates an application image 708 in a standard address space (corresponding to bank 0/1, above) may be operated on by an address translator 710 that translates the standard address in the standard address space by an address offset (shown as an addition of 0x600000 in FIG. 7) to obtain an application image 712 with a translated address in the alternate address space (corresponding to banks 2/3, above).

Figure 8:
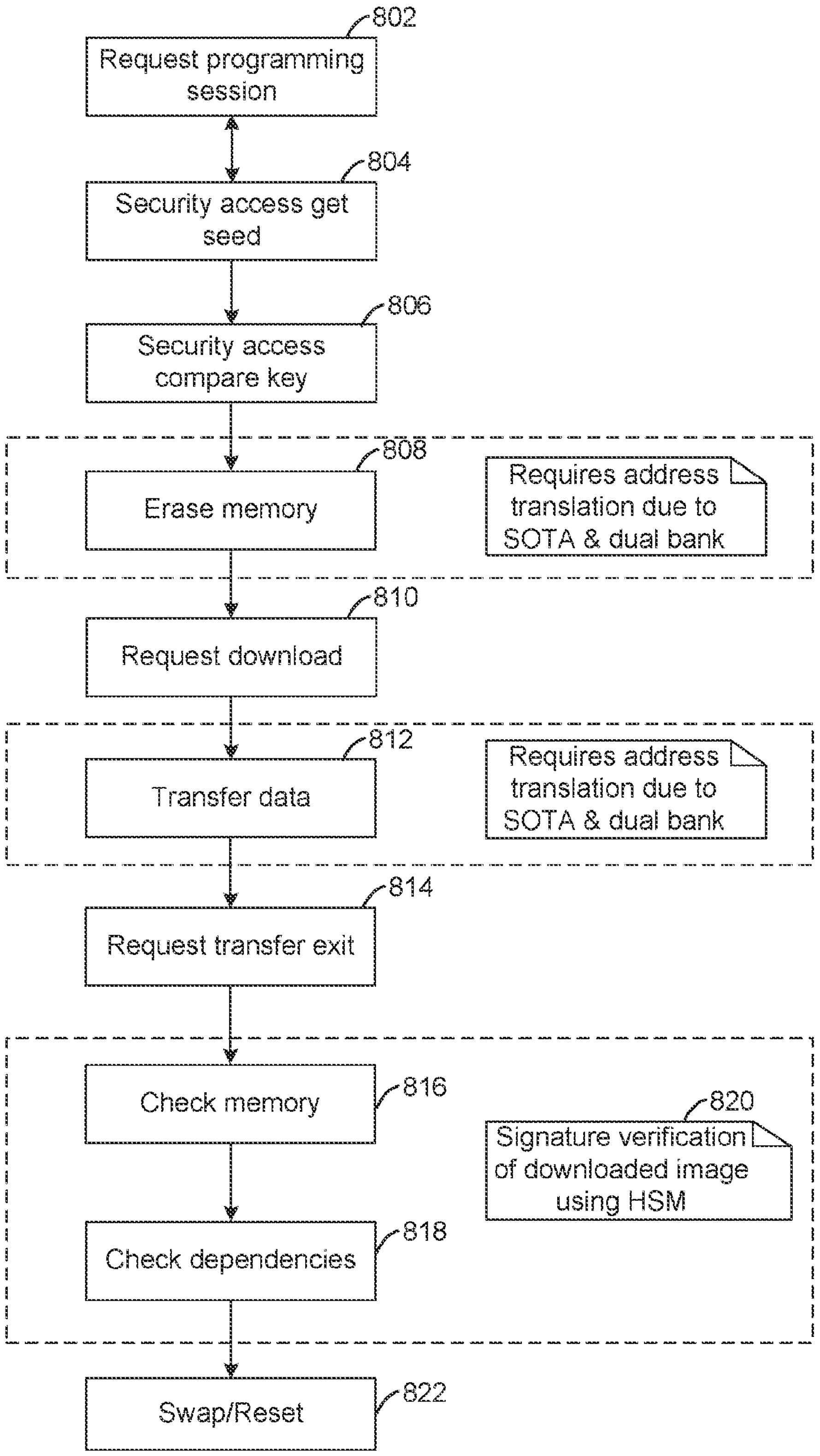
FIG. 8 is a flowchart illustrating a secure flashing process for the system of FIG. 1.

FIG. 8 illustrates an example secure flash sequence over the UDS protocol, using the address translation techniques of FIGS. 3-7. In the example of FIG. 8, a programming session may be requested (802). This request signifies that a UDS client tool requests a start of reprogramming of an ECU and indicates that current running software will take corresponding actions.

A security access get seed may then be performed (804). For example, the Tricore boot loader may share some fixed numbers of random bytes (where the number of bytes may be decided by at a time of development). A security access compare key operation may then be performed (806), in which the UDS client calculates a key by performing some mathematical calculation on the seed provided in the previous step. A UDS server may perform the same mathematical operation and compare the result with the key sent by the UDS client. If the key matches, then the UDS server may send a positive response.

Then, a memory erase may be performed (808). For example, appropriate bank of flash memory may be erased according to a block ID included in an erase request. As noted in FIG. 8, and in accordance with the above description, the erase operation uses the described address translation operations of FIGS. 6 and 7, e.g., to write to bank B 156.

A download may then be requested (810). For example, a block ID and number of bytes that the UDS client will send in each transfer data message may be identified.

A data transfer (812) may then be executed. That is, data may be transmitted to the UDS server to be written to flash memory, again using the address translation techniques as described herein and noted in FIG. 8.

More specifically, CPU writes may be redirected to the alternate bank's physical address. For example, when bank A is active, address translation from standard address space to alternate address space may be achieved using the address translation illustrated in FIG. 7.

In some scenarios, bank B may be active, such as when a previous SOTA has been executed. In such scenarios, updates are flashed to bank A, in which case the physical address (standard address) is used to write the update image to bank A without any address translation being required.

A transfer exit may be requested (814). For example, the transfer exist may be required to terminate a server/client data transfer. This operation may also include determining whether all the bytes to flash are received by the UDS server.

A check memory routine may then perform (816), e.g., a cyclic redundancy check (CRC) and/or signature verification on received data bytes to verify whether the received bytes are correct. A check dependencies routine may also be performed (818) to perform a version check on all dependent blocks. In the example of FIG. 8, after the image is written to flash, signature verification (820) may be included and may be executed using the HSM to check the authenticity and integrity of the downloaded image.

As may be understood from the above description of FIGS. 1 and 2, and as shown and described in more detail, below, with respect to FIGS. 9-11, a BOOT_MAC of the bootloader (as the root of trust) is modified upon every successful bootloader download. Regeneration of BOOT_MAC (to obtain a pre-boot BOOT_MAC, and similarly for a pre-boot APP_MAC) is thus triggered after a successful signature authentication of a bootloader image, e.g., at the check memory (816) and check dependency (818) stages, as depicted below in FIG. 11. In conjunction therewith, an address(es) of the pre-boot BOOT_MAC/APP_MAC may be stored using the standard (active) address range.

After successful signature verification, a swap and reset may be triggered over UDS (822). As also shown in FIG. 11, subsequent verification of a BOOT_MAC and APP_MAC may be performed successfully, because such verification will be performed using the standard address range in the now-active bank B, which will correspond to the address range stored in conjunction with the earlier calculation of the pre-boot BOOT_MAC and pre-boot APP_MAC.

Figure 9:
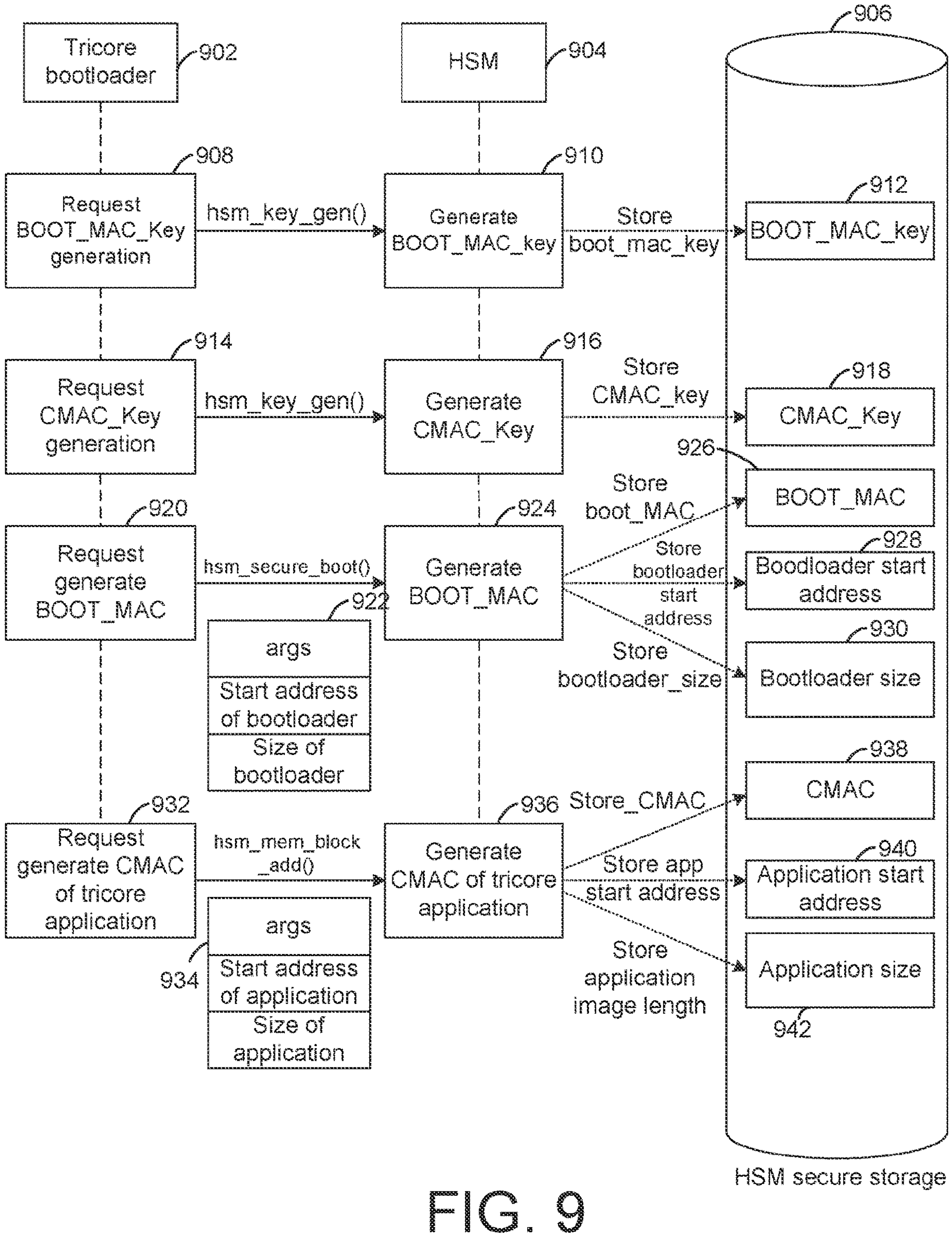
FIG. 9 is a block diagram illustrating a secure boot initialization process for the system of FIG. 1.
Figure 10:
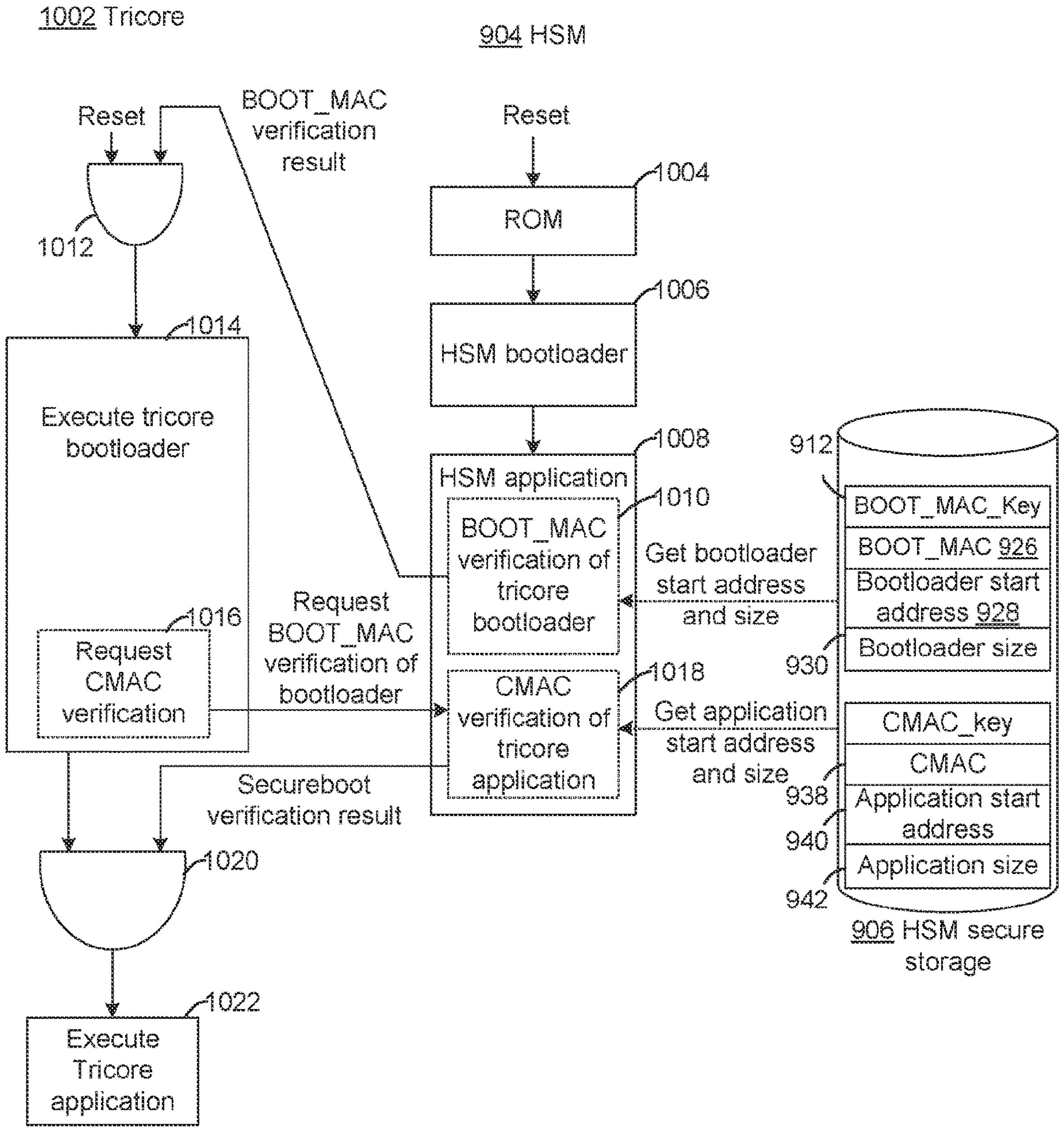
FIG. 10 is a block diagram illustrating a secure boot process for the system of FIG. 1.

FIGS. 9 and 10 illustrate examples related to such successful MAC verification operations, e.g., following a swap/reset operation(s) (822) of FIG. 8. Specifically, FIG. 9 illustrates a secure boot initialization (init) sequence, and FIG. 10 illustrates a secure boot sequence.

In the secure boot init sequence of FIG. 9, a Tricore bootloader 902 (analogous, e.g., to the bootloader 168 of FIG. 1) communicates with HSM 904 (analogous, e.g., to the HSM 150 of FIG. 1) via intervening HSM interfaces (as part of, e.g., to the HSM module 164 of FIG. 1), to store resulting data within HSM secure storage 906 (analogous, e.g., to the secure storage 152 and/or the HSM module 164 of FIG. 1).

In FIG. 9 and otherwise herein, BOOT_MAC_KEY refers to a cryptographic key used to verify the authenticity and integrity of the Tricore bootloader 902, and is required for the illustrated examples of BOOT_MAC verification. Therefore, a request (908) for BOOT_MAC_KEY generation is made using interface hsm_key_gen( ) to cause the HSM to generate (910) the BOOT_MAC_KEY, and then store the resulting BOOT_MAC_KEY 912 in the HSM secure storage 906. For example, DATA FLASH 1 (DFLASH 1) of Aurix may be dedicated to HSM secure storage and may be common between Bank A and Bank B.

While BOOT_MAC_KEY is used for BOOT_MAC authentication of Tricore bootloader, CMAC_KEYs used for CMAC verification of an application, where, e.g., CMAC is an example of APP_MAC, referenced above. Therefore the Tricore bootloader 902 may request (914) HSM 904 to generate CMAC_KEY (916) using interface hasm_key_gen( ), for secure boot extension, and store the resulting CMA_key 918 in HSM secure storage 906.

As noted above, a MAC of Tricore bootloader 902 used in secure boot may be called BOOT_MAC. Thus, BOOT_MAC 926 may be requested (920) by the Tricore bootloader 902 using interface hsm_secure_boot( ), with arguments 922 that include a start address of the Tricore bootloader 902 and a size of the Tricore bootloader 902. After generating the BOOT_MAC (924), the HSM 904 may store the BOOT_MAC 926, the start address 928 of the Tricore bootloader 902 and the size 930 of the Tricore bootloader 902 in the HSM secure storage 906.

Similarly, CMAC 938 may be requested (932) by the Tricore bootloader 902 using interface hsm_mem_block-add( ), with arguments 934 that include a start address of the application and a size of the application. After generating the CMAC (936), the HSM 904 may store the CMAC 938, the start address 940 of the application and the size 942 of the application in the HSM secure storage 906.

FIG. 10 illustrates an example Secureboot sequence of Tricore bootloader 902 and an associated Tricore Application on a Tricore 1002. In the example of FIG. 10, at cold or warm reset, Aurix executes Startup software (SSW) from its BootROM. If the User Configuration Block (UCB) for the HSM is enabled, it allows Boot Software (BOS) to execute from HSM ROM 1004. Aurix SSW executes until it arrives at a decision point, and waits on a handshake from the HSM 904.

Specifically, the HSM BOS starts HSM bootloader 1006 that verifies and securely boots HSM application 1008 (analogous, e.g., to the HSM bootloader 414 and HSM application 416 of FIG. 4). The HSM application 1008 reads Bootloader start address 928 and size 930 stored in HSM secure storage 906 and recomputes BOOT_MAC to compare with the pre-boot BOOT_MAC 926 stored in the HSM secure storage 906. If the computed BOOT_MAC matches the stored pre-boot BOOT_MAC, then the Aurix CPU may be released by the AND gate 1012 to execute (1014) Tricore Bootloader 902.

Tricore bootloader 902 may then request (1016) CMAC verification of the Tricore application from the HSM application 1008. The HSM application 1008 may then read the Tricore application start address 940 and size 942, and may compute the CMAC of the Tricore application image. If computed CMAC matches with the pre-boot application CMAC 938 stored in the HSM secure storage 906, the HSM application handshakes with the Tricore Bootloader using AND gate 1020 to allow execution (1022) of the Tricore Application.

Figure 11:
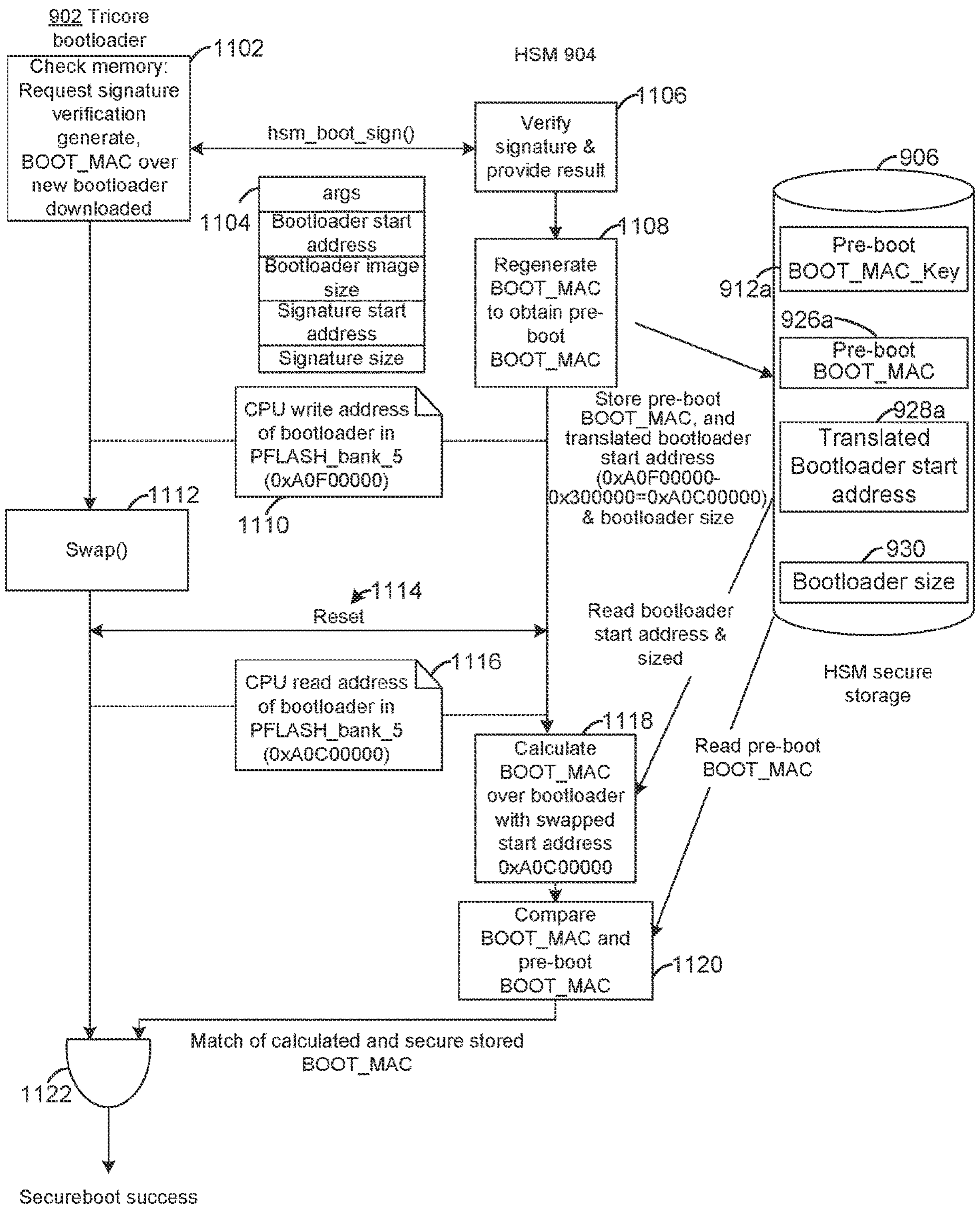
FIG. 11 is a block diagram illustrating a more detailed example implementation of SOTA flashing for dual bank memories, in which a bootloader is updated, and secure boot of the bootloader.

FIG. 11 illustrates an example process that spans the examples of FIGS. 8-10, with a focus on illustrating successful use of the address translation techniques of FIGS. 2-7 in the context of performing an OTA bootloader update (analogous to an update of the bootloader 162 with bootloader 168 in FIG. 1). In particular, FIG. 11 begins with the check memory/check dependencies operations (816, 818) of FIG. 8 and spans the secure boot operations of FIGS. 9 and 10.

Thus, in FIG. 11, as part of the check memory operation as just referenced, the Tricore bootloader 902 may request (1102) signature verification of a downloaded bootloader image using api hsm_boot_sign( ), and passing arguments 1104 that include the downloaded bootloader start address, image size, signature start address and signature size. Specifically, for example, the arguments 1104 may include the bootloader start address and signature start address within the inactive address range of the inactive bank to which the bootloader is being downloaded, and the signature may be verified using the signature start address within the inactive address range.

Upon successful signature verification (1106), the HSM 906 regenerates BOOT_MAC of the new downloaded bootloader (1108), using a pre-boot BOOT_MAC_KEY 912*a*, to obtain a pre-boot BOOT_MAC 926*a*, using the bootloader start address 928 and bootloader size 930 received with hsm_boot_sign( ), and stores the computed pre-boot BOOT_MAC 926*a* along with the bootloader start address 928 and bootloader size 930 in HSM secure storage 906.

In conjunction therewith, the HSM 906 stores the pre-boot BOOT_MAC 926*a* and a translated bootloader start address 928*a* that is obtained using the address translation techniques of FIGS. 2-7. Specifically, as shown, address translation from the alternate address range to the standard address range may be performed by subtracting the address offset of 0x300000, assuming Bank A is active, to translate the alternate address of 0xA0F00000 to the standard address of 0xA0C00000. Meanwhile, a CPU write address (1110) used for flashing the updated bootloader may be in the alternate address range or space, so that the original write address 0xA0F00000 is used. In other words, when bank A is active, the new bootloader is downloaded to bank B at PFLASH bank 5 (0xA0F00000).

After successful BOOT_MAC regeneration, Tricore bootloader enables bank swap 1112, e.g., by updating UCB for swap. If the start address 0xA0F00000 were stored in secure storage 906, then, after reset (1114), the CPU read address (1116) of FLASH bank 5 would be mapped to a standard address, i.e., 0xA0C00000, while the address 0xA0F00000 would map to PFLASH bank 4. The resulting BOOT_MAC calculated over the bootloader image from the start address stored in secure storage (0xA0F00000) in PFLASH Bank 4, when compared with the BOOT_MAC of the bootloader in PFLASH bank 5 stored in secure storage (calculated over the bootloader image from the swapped start address in the standard address space), would result in a mismatch, and the HSM 904 would prevent the Tricore CPU from executing the new bootloader, so that a secure boot would fail.

In FIG. 11, however, this problem is solved because the BOOT_MAC is calculated (1118) with the swapped start address in the standard address space, just as the pre-boot BOOT_MAC was calculated using the (translated) start address in the standard address space. Consequently, when comparing (1120) the BOOT_MAC 926 with the pre-boot BOOT_MAC 926*a*, a successful match may be made, so that an AND gate 1122 enables secure boot success.

Similar comments apply to a secure boot extension for any application other than the bootloader that is updated. For example, an application start address in an alternate address space may be translated to a corresponding standard start address in a standard address space (if bank A is active). Moreover, the swap 1112 and subsequent secure boot may be enabled in the check dependencies stage (818), only after the successful pre-boot BOOT_MAC and pre-boot CMAC regeneration have occurred, to also ensure a successful MAC match(es).

Thus, described techniques enable Secureboot processes that are leveraged to securely update software over the air, including HSM Firmware (F/W) secureboot processes, as referenced herein. For example, a pre-boot APP_MAC may be calculated over a HSM application image and may then be verified by a HSM bootloader. HSM application F/W can be updated over the air and a new MAC may be calculated. A BOOT_MAC_KEY may be used to verify the integrity and authenticity of the software and to verify a corresponding BOOT_MAC. Optionally, BOOT_MAC_KEY may be generated by HSM F/W. BOOT_MAC may store the MAC of the Host bootloader in HSM DFLASH. As also referenced, host software may include comprises more than one block in PFLASH, such as bootloader, application, or calibration. Secureboot extension may be used to validate host applications other than the root of the trust (bootloader).

As also referenced, SOTA with a swap mechanism may require complete duplication of all the software blocks in PFLASH. As a result, as described, a HSM update mechanism may be leveraged to duplicate the HSM image and program in a separate flash sector in an inactive bank.

Described techniques solve the problem(s) of a BOOT_MAC calculation by HSM on an incorrect address block by, e.g., allowing the HSM to internally use a signature key id to verify the signature of a new bootloader for programming, based on chosen asymmetric algorithm. If the signature is verified successfully, then the HSM may trigger a pre-boot BOOT_MAC computation on a translated start address and size of the new bootloader.

Implementations of the various techniques described herein may be implemented in digital electronic circuitry or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatus, e.g., a programmable processor, a computer, or multiple computers. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may, or be operatively coupled to, receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:

receive, via a wireless network interface, an over-the-air (OTA) update of a software application using an application image, using a dual bank architecture with a first memory bank having a first address space and a second memory bank having a second address space;

calculate a pre-boot application authentication code for the application image;

write the application image to the second address space, using a start address;

execute a swap of the first address space and the second address space with respect to the first memory bank and the second memory bank, so that the application image has a swapped start address instead of the start address;

perform a reset of the dual bank architecture;

calculate an application authentication code for the application image, using the swapped start address; and verify the application image based on comparing the pre-boot application authentication code and the application authentication code, wherein an address offset is applied during calculation of either the pre-boot application authentication code or the application authentication code to thereby obtain a common address space, and wherein address values of the common address space are used in calculating the pre-boot application authentication code and the application authentication code.

2. The computer program product of claim 1, wherein the first address space is a standard address space, and the second address space is an alternate address space, and further wherein the first memory bank is active and executing an earlier version of the application image during application of the address offset.

3. The computer program product of claim 1, wherein the instructions, when executed, are further configured to cause the at least one computing device to:

duplicate a security module from the first memory bank to the second memory bank to maintain cryptographic operations during the over-the-air (OTA) update; and calculate the pre-boot application authentication code and the application authentication code using the security module.

4. The computer program product of claim 3, wherein the instructions, when executed, are further configured to cause the at least one computing device to:

store the pre-boot application authentication code in a secure storage of the security module.

5. The computer program product of claim 1, wherein the instructions, when executed, are further configured to cause the at least one computing device to:

verify an application signature of the application image using the second address space, prior to calculating the pre-boot application authentication code.

6. The computer program product of claim 1, wherein calculating the pre-boot application authentication code and the application authentication code using the common address space yields mathematically identical cryptographic values.

7. A computer-implemented method comprising:

receiving, via a wireless network interface, an over-the-air (OTA) update of a software application using an application image, using a dual bank architecture with a first memory bank having a first address space and a second memory bank having a second address space;

calculating a pre-boot application authentication code for the application image;

writing the application image to the second address space, using a start address;

executing a swap of the first address space and the second address space with respect to the first memory bank and the second memory bank, so that the application image has a swapped start address instead of the start address;

performing a reset of the dual bank architecture;

calculating an application authentication code for the application image, using the swapped start address; and verifying the application image based on comparing the pre-boot application authentication code and the application authentication code, wherein an address offset is applied during calculation of either the pre-boot application authentication code or the application authentication code to thereby obtain a common address space, and wherein address values of the common address space are used in calculating the pre-boot application authentication code and the application authentication code.

8. The method of claim 7, wherein the first address space is a standard address space, and the second address space is an alternate address space, and further wherein the first memory bank is active and executing an earlier version of the application image during application of the address offset.

9. The method of claim 7, further comprising:

duplicating a security module from the first memory bank to the second memory bank to maintain cryptographic operations during the over-the-air (OTA) update; and calculating the pre-boot application authentication code and the application authentication code using the security module.

10. The method of claim 7, further comprising:

verifying an application signature of the application image using the second address space, prior to calculating the pre-boot application authentication code.

11. The method of claim 7, wherein calculating the pre-boot application authentication code and the application authentication code using the common address space yields mathematically identical cryptographic values.

12. A vehicle comprising:

a chassis;

a frame mounted on the chassis;

a motor mounted within the frame;

a plurality of sensors mounted on the vehicle and configured to generate sensor data characterizing an environment of the vehicle;

at least one memory including instructions; and at least one processor that is operably coupled to the at least one memory and that is arranged and configured to execute instructions that, when executed, cause the at least one processor to receive, via a wireless network interface, an over-the-air (OTA) update of a software application using an application image, using a dual bank architecture with a first memory bank having a first address space and a second memory bank having a second address space;

calculate a pre-boot application authentication code for the application image;

write the application image to the second address space, using a start address;

execute a swap of the first address space and the second address space with respect to the first memory bank and the second memory bank, so that the application image has a swapped start address instead of the start address;

perform a reset of the dual bank architecture;

calculate an application authentication code for the application image, using the swapped start address; and verify the application image based on comparing the pre-boot application authentication code and the application authentication code, wherein an address offset is applied during calculation of either the pre-boot application authentication code or the application authentication code to thereby obtain a common address space, and wherein address values of the common address space are used in calculating the pre-boot application authentication code and the application authentication code.

13. The vehicle of claim 12, wherein the first address space is a standard address space, and the second address space is an alternate address space, and further wherein the first memory bank is active and executing an earlier version of the application image during application of the address offset.

14. The vehicle of claim 12, wherein the instructions, when executed, are further configured to cause the at least one processor to:

verify an application signature of the application image using the second address space, prior to calculating the pre-boot application authentication code.

15. The vehicle of claim 12, wherein calculating the pre-boot application authentication code and the application authentication code using the common address space yields mathematically identical cryptographic values.

* * * * *